United States Patent [19]
De la Cierva

[11] 3,871,236
[45] Mar. 18, 1975

[54] DEVICE FOR THE MECHANICAL STABILIZATION OF THE ALIGNMENT OF INSTRUMENTS

[76] Inventor: Juan J. De la Cierva, Apolonio Morales 21, Madrid, Spain

[22] Filed: Apr. 5, 1973

[21] Appl. No.: 348,171

[52] U.S. Cl. .............................................. 74/5.22
[51] Int. Cl............................................ G01c 19/46
[58] Field of Search .......... 74/5.22, 5.34, 5.37, 5.7, 74/5.9

[56] References Cited
UNITED STATES PATENTS
1,150,311  8/1915  Sperry.................................. 74/5.34
2,914,945  12/1959  Cleveland ............................ 74/5.22
FOREIGN PATENTS OR APPLICATIONS
464,315  4/1937  United Kingdom................ 74/5.7

*Primary Examiner*—Wesley S. Ratliff, Jr.
*Attorney, Agent, or Firm*—Lewis H. Eslinger; Alvin Sinderbrand

[57] ABSTRACT

An instrument stabilizing system has a stabilizer device located between the rigid support mounted in the vehicle frame for carrying the instrument to be stabilized and the instrument itself. The stabilizer device carries the control means to be employed by the operator for aiming the line of sight of the instrument at the target. The stabilizer device is mounted on the fixed support of the vehicle by means of a suspension consisting of two axles held by means of an appropriate bar, said axles corresponding to the movements of aximuth and elevation respectively.

7 Claims, 9 Drawing Figures

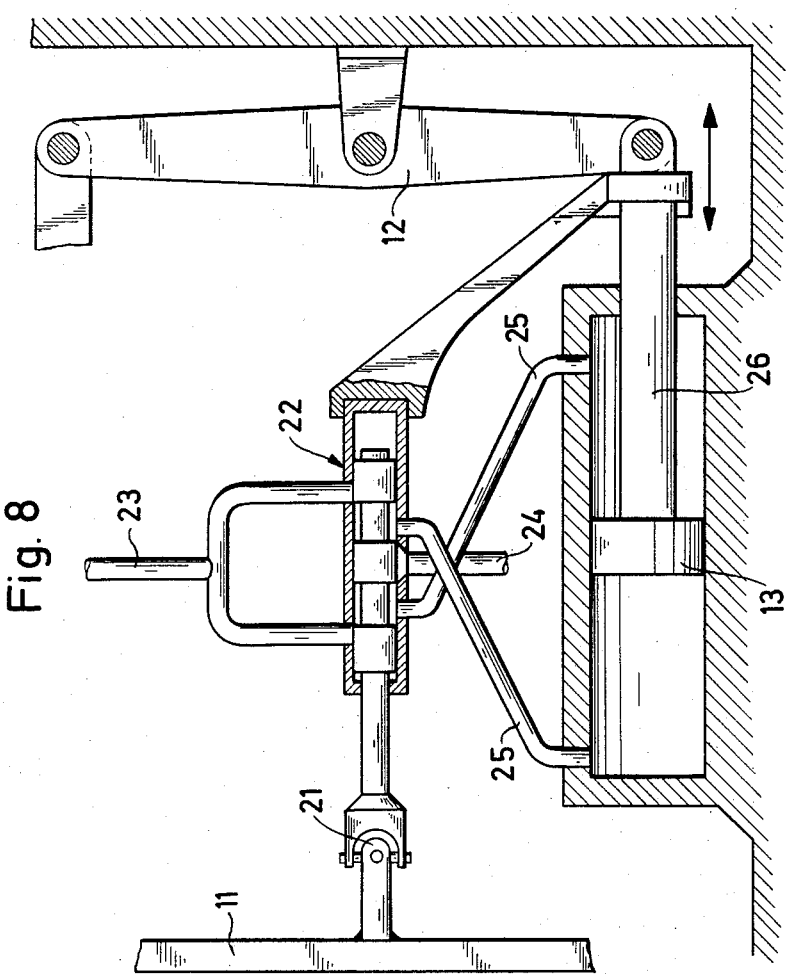

DEVICE FOR THE MECHANICAL STABILIZATION OF THE ALIGNMENT OF INSTRUMENTS

The present application relates to a system for mechanically stabilizing the alignment of instruments with line of sight.

It is well known that, in militray applications, the mobility of a vehicle is one of its best means of defence. However, this same mobility also implies the generation of movements and vibrations, which make it extremely difficult to aim from these vehicles at a target, particularly with light armament. Hitherto, accurate firing from such vehicles in motion could only be accomplished with the aid of very complex and expensive systems, which moreover were relatively difficult to operate.

The system described in the present specification solves this problem in a simple and highly economical manner. Thus, the cost/efficiency ratio of this system is very high, and offers the possibility of developing new tactics in the realm of military, police, rescue and counter-insurgency operations.

The basic feature of the stabilizing system is the stabilizer device located between the rigid support mounted in the vehicle frame for carrying the instrument to be stabilized and the instrument itself. The stabilizer device carries the control means to be employed by the operator for aiming the line of sight of the instrument at the target. The stabilizer device is mounted on the fixed support of the vehicle by means of a suspension consisting of two axles held by means of an appropriate bar, said axles corresponding to the movements of azimuth and elevation respectively.

Above this stabilizer device there is provided a stabilized platform on which the instrument to be stabilized is rigidly mounted, while the stabilized platform is in turn fast with the stabilizer device by means of a suspension (likewise of two axes, azimuth and elevation), the angles of which are controlled automatically by the gyroscope mechanism accomodated in the interior of the stabilizer device.

The principal feature of this system, being object of the present invention, is that the operator does not handle directly the instrument to be stabilized, but rather the aiming movements are carried out by the control means with which the stabilizer device is provided. These means are equipped with appropriate transmission elements, which transmit to the instrument to be stabilized the instructions or movements exerted on them by the operator, transmission elements which may be constituted by flexible cables or other means.

The mechanical separation of the operator from the instrument to be stabilized is necessary for the proper functioning of the system, in that the commands emitted by the operator are subject to involuntary movements of diverse origin, for example the movements inherent in the human body, the movements induced by the accelerations of the vehicle, and the vibrations generated in the engines and other elements. As will be seen in the following, such involuntary movements are not transmitted to the instrument to be stabilized which, in consequence, can be aimed at the target with maximum accuracy, its line of sight remaining unaffected by the transient variations of the stabilizer device.

The object of the present application will now be described with reference to a preferred form of embodiment, given by way of example, and illustrated in the attached drawings, wherein:

FIG. 8 illustrates schematically the transmission mechanism being part of the object of the present application.

Figure 1:
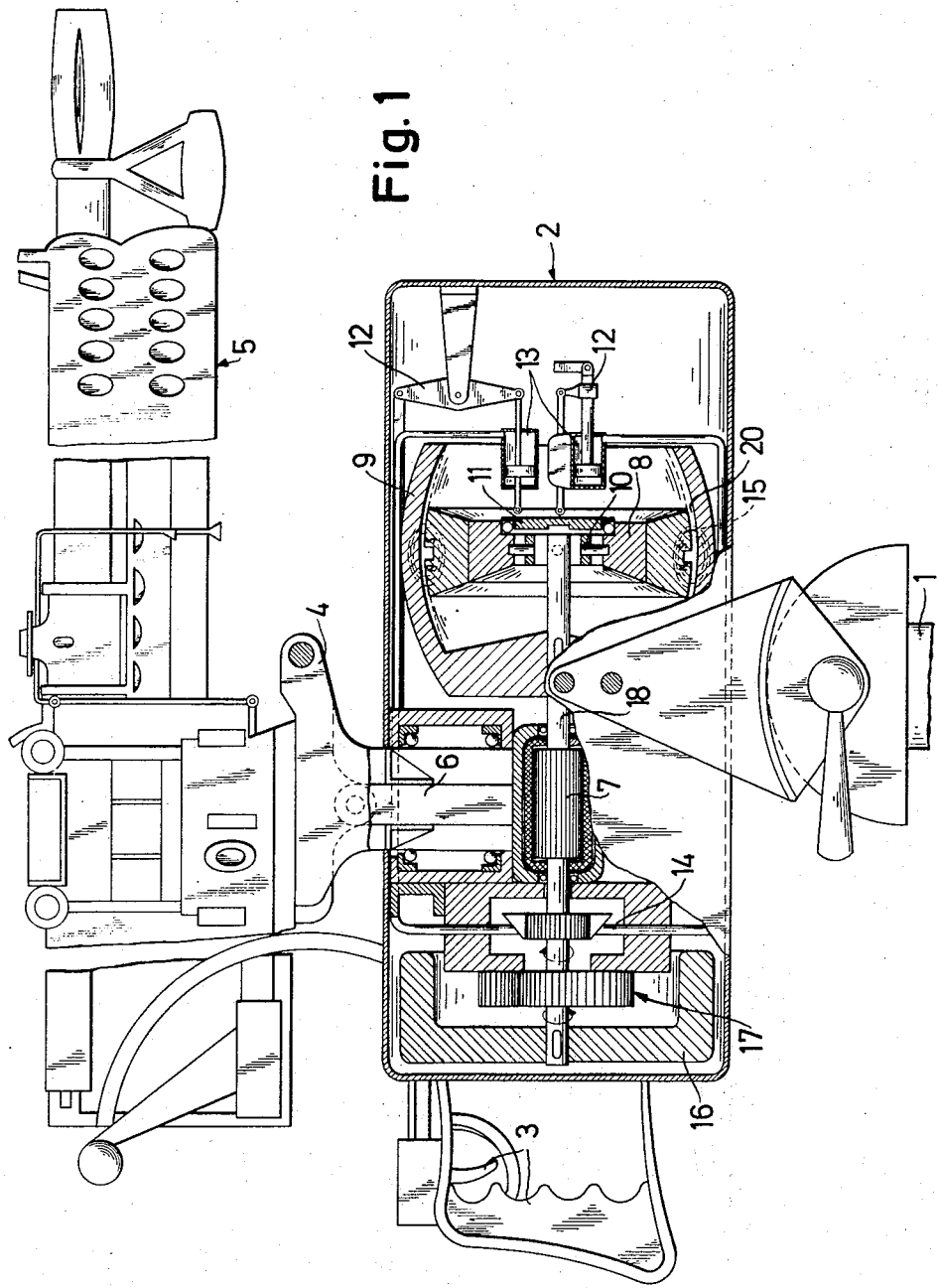
FIG. 1 is a general schematical view in elevation of the system according to the invention, incorporated in an instrument with line of sight.

Referring now to the drawings and, in particular, to FIG. 1, the latter shows schematically an elevation of the arrangement according to the present invention, located between a fixed support of the vehicle and the instrument to be stabilized, assuming, in this preferred form of embodiment of the invention, that the instrument to be stabilized is a light weapon, for example a machine-gun.

Reference 1 designates the tubular support mounted in the frame of the vehicle, on which there is mounted a bracket capable of oscillating about two axes, a vertical one (that of the tubular support) and a horizontal one (indicated by shading in the same Figure), which bracket carries the stabilizer device 2. constituted by a housing, preferably cylindrical, which surrounds the stabilizer device according to the present invention, and has at its left-hand extremeity (as seen in FIG. 1) the control means 3 of the instrument 5 to be stabilized, said instrument 5 being mounted on the device 2 by means of a stable platform 4 and some appropriate suspension elements 6 of known type.

In FIG. 1, reference 7 designates a small actuating motor, for example an electric motor, the protruding shaft of which carries at one of its ends (referenced 18 in the drawing) a partly spherical sleeve or drum 9 fast with said shaft 18, which extends in the interior of said drum 9 over a distance which is smaller than the overall length of the partly spherical drum. On the free end of this extension of the acutator shaft there is mounted a gyroscope 8 over an interposed universal joint 10, which enables the gyroscope to tilt or oscillate relative to the internal axis of the partly spherical drum 9. In the free face of this gyroscope 8 there is mounted a disc 11, which remains fixed when the gyroscope rotates, thanks to an appropriate bearing by means of which it is fitted into a centrally formed recess of the gyroscope 8. This disc 11 will transmit the movements of the gyroscope 8, relative to the geometrical axis of the aforedescribed actuating device, to two hydraulic servoguided pistons 13 which, through an appropriate transmission mechanism 12, will transmit these amplified movements to the unit constituted by the stable platform 4 and the instrument 5 to be stabilized.

The hydraulic pressure for the hydraulic transmission circuit comprising the two pistons 13 is supplied by a hydraulic cylinder 14, the rotor of which is fast with the protruding axle of the motor 7 and is mounted at that end of said shaft which is opposite to the end carrying the drum 9. The end of the shaft of this hydraulic cylinder transmits its rotary movement to a motion-inverting gear box 17, the shaft end of which rotates in turn a reaction flywheel 16 in the direction of rotation contrary to the direction of rotation of the whole stabilizing assembly so far described.

The control means 3 mounted at the left-hand end of the stabilizer device 2 may advantageously comprise in this particular form of embodiment a trigger for operating the machine gun 5, or, in another form of embodiment, a sighting camera.

The operation of this system will now be explained in detail, as well as the functioning of each of the elements forming part of said system.

To operate an instrument mounted on the stabilized plateform, it will be sufficient for the operator to direct the horizontal geometrical axis of the stabilizer device or cylinder at the target, using control means 3, after unlocking the suspension axles between the device 2 and the support and operating the actuator switch of the device.

The alignment between the stabilized instrument and the target is completed by observing the target through optical sight (optionally provided) and correcting the initial alignment by natural movements along both axes (azimuth and elevation) of the articulation of the support, said movements being likewise carried out by means of the control elements of the stabiliser device 2.

It is to be noted here that the observation of the target acquisition, identification, tracking - benefit to an extraordinarily high degree from the stabilization relative to the movements of the vehicle. It makes possible the use of sights with, usually, up to ten magnifications, depending on the applications of the system.

It is already been mentioned that the operator, being subject to his own movements and those communicated to him by the moving vehicle, is unable to create and to maintain an accurate alignment between the control means, the stabilizer device 2 and the target (not illustrated).

Figure 2:
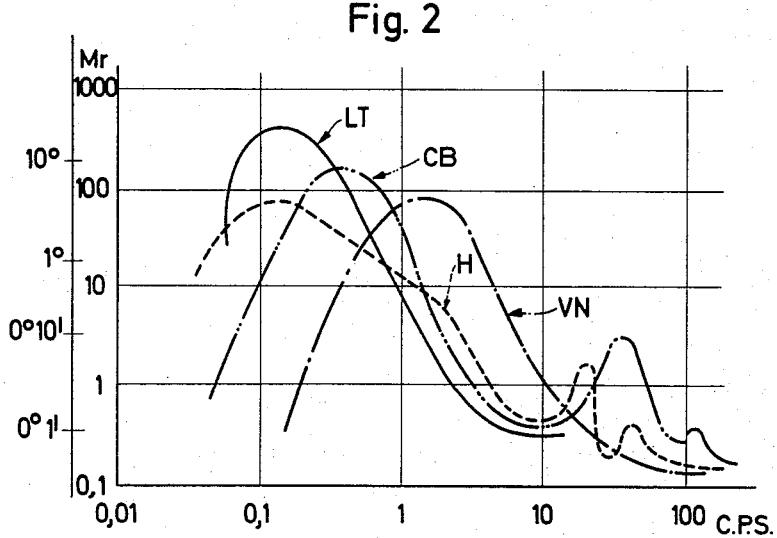
FIG. 2 is a graphic, showing a number of statistical alignment curves corresponding to various vehicles, obtained empirically.

FIG. 2 shows statistical alignment curves corresponding to various vehicles, obtained partly by the Applicant in the course of previous studies relating to other stabilizing and fire-director systems.

This FIG. 2 shows the typical vibration spectra of various vehicles, namely: a torpedo boat (LT), a tracked armoured vehicle (CB), a helicopter (H) and tyre-mounted vehicle (VN), plotting the frequency in cycles/second in abscissa and the characteristic angle of oscillation in ordinate.

It will be apparent from this figure that the stabilizer device cannot be aligned directly with the target at all instants, but rather that this aligment is effected within a cone, the geometrical axis of which is constituted by the operator-target line. It is to be noted here that the operator will be able to maintain the median direction of the stabilizer cylinder with accuracy, although he will be unable to avoid the movements to one side or the other of this median direction owing to his own movements and the movements communicated to him by the vehicle.

The basic element of the stabilizer device is a gyromagnetic mechanism, which orients the device fixed thereon relative to itself, in such a manner, that the stabilized platform aligns itself with the median of the stabilizing cylinder, thus resulting in the perfect alignment of the instrument to be stabilized with the target, in spite of the vibrations and sudden movements of the vehicle and of the operator.

It is important to note that, the separation between the operator and the stabilized instrument notwithstanding, the target can be followed in its movement relative to the vehicle, in that the operator wil instinctively superimpose on his involuntary vibratory movements the voluntary movements involved in changing the alignment by means of the stabilizer device and, consequently, the orientation of the stable platform.

The applicant has conceived and designed various optical stabilizaton systems for experimental verification of the ease of operation which characterizes these. All these systems are limited to the stabilization of an optical image or beam of light using a liquid prism called "DYNALENS," which allows the optical instrument to continue its movements, the novelty and originality of the system described in the present specification consisting in that with its aid the device as a whole can be stabilized, and that it opens up entirely new fields of application. Moreover - and this constitutes a fundamental difference between the previous studies and the work herein described - this system is entirely mechanical which, as will be seen, leads to a very substantial reduction in acquisition and maintenance costs.

It will be apparent from a further study of FIG. 1 that the plane defined by the gyroscope 8 is also the plane of the disc 11 and constitutes in fact the stabilized plane, the perpendicular of which must be aligned at all instants with the device or instrument to be stabilized. As already stated, the transmission mechanism 12 which transmits the movements of disc 11 to the stabilized platform 4 compensates the sudden movements or the vibrations communicated by the tubular support 1 to the assembly as a whole.

This transmission mechanism must be irreversible, that is to say, it must be capable of transmitting the forces which align the stable platform 4 with the geometrical axis of the disc 11, and, at the same time, preventing the transmission of forces and couples generated in the stable platform to the disc 11. These forces may derive from disequilibrium, retrocession, inertia or accelerations of the control means and must not be transmitted to said disc 11. For this reason, the transmission mechanism consists of two pistons 13 operated by hydraulic energy generated by the small cylinder 14, which will be described later on in the specification.

The projecting axles of the servo-guided pistons are mechanically connected with the azimut and elevation axes of the stable platform 4, thus ensuring the desired alignment between the latter and the disc 11.

Considering now the gyroscope 8 and the partly spherical drum 9, it will be noted that the outer ring of the gyroscope mass is formed by a permanent magnet 15, magnetized along the whole of its circumference as indicated in FIG. 1. On the other hand, the drum 9 is made of a non-magnetic material but one having a low electrical resistivity, for example aluminium.

In order to understand the mode of functioning of the device according to the invention, it is essential to have a clear understanding of the interaction between the gyroscope 8 and the partly spherical drum 9; accordingly, the functioning of these two elements will be explained in the following.

Figure 3:
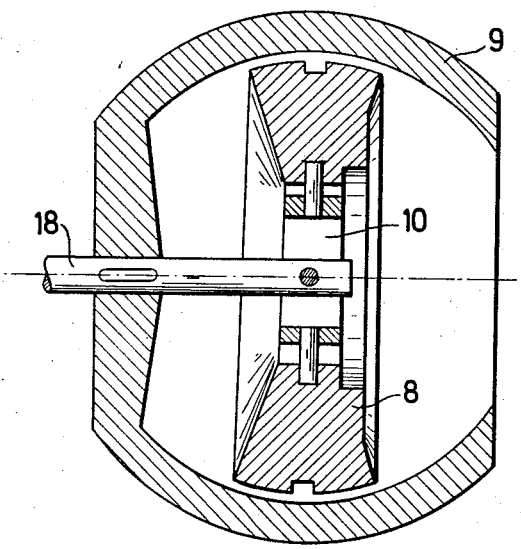
FIGS. 3 to 7 are schematical views, illustrating in more detail the mode of functioning of the gyroscope system comprised in the arrangement of the present invention.

Let us assume firstly that the axis of the gyroscope 8 and the partly spherical drum 9 coincide, as illustrated in FIG. 3. Since both of these elements are rotated at the same velocity by the motor 7, there will be no relative movements in this case between the magnetized crown 15 of the gyroscope 8 and the drum 9, since the gyroscope does not generate forces of any kind and behaves exactly as if it were a free gyroscope, that is to say, it will retain its plane of inertia indefinitely.

Figure 4:
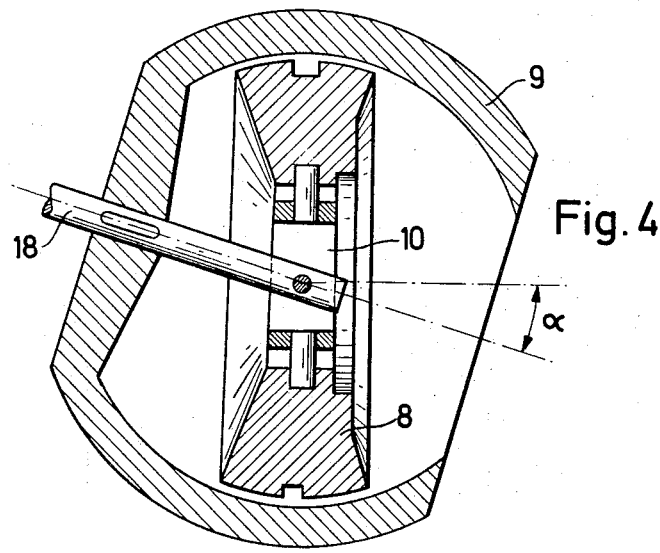

Let us now assume that the drive shaft 18 and thus the axis of the stabilizer device 2 is suddenly and rapidly displaced at an angle alpha (see FIG. 4) relative to its previous position. Initially, the gyroscope 8 will retain its previous position, due to its gyroscopic inertia. The stable platform 4 and its instrument or device 5 to be stabilized will of course remain immobile, in spite of the movement of the stabilizer device 2, because the alignment of said platform will always correspond to that of the gyroscope, as already explained.

If there would be no magnetic interaction between the gyroscope 8 and the drum 9, the former would would retain its alignment indefinitely, in total independence of the movements of the vehicle and of the drum 9, provided that these do not exceed the limits of the cone of freedom defined by the universal joint 10. However, the presence of the magnet 15 on the periphery of the gyroscope 8 generates interaction forces which compel the gyroscope to realign itself slowly with the axis of the partly spherical drum 9, following a plane trajectory, that is to say, not describing a spiral. This gyrodynamic feature of the system is a truly particular and original one, since it is well known that a gyroscope precesses in its movement relative to the origin of its impulse, giving rise to spiral movements when directional couples are applied.

It will be explained in the following how the interaction between the magnet 15 and the partly spherical drum 9 results in a plane motion of the gyroscope 8.

When the geometrical axes of the two elements are disaligned (FIG. 4), each point of the magnet moves along a meridional of the drum 9 (said meridional being defined as a greatest circle of the drum which passes through the geometrical axis of the motor 7). The movement is thus sinusoidal, of a frequency equal to the common rotational frequency, with a maximum amplitude equal to the angle alpha of the disalignment between the two geometrical axes.

Figure 5:
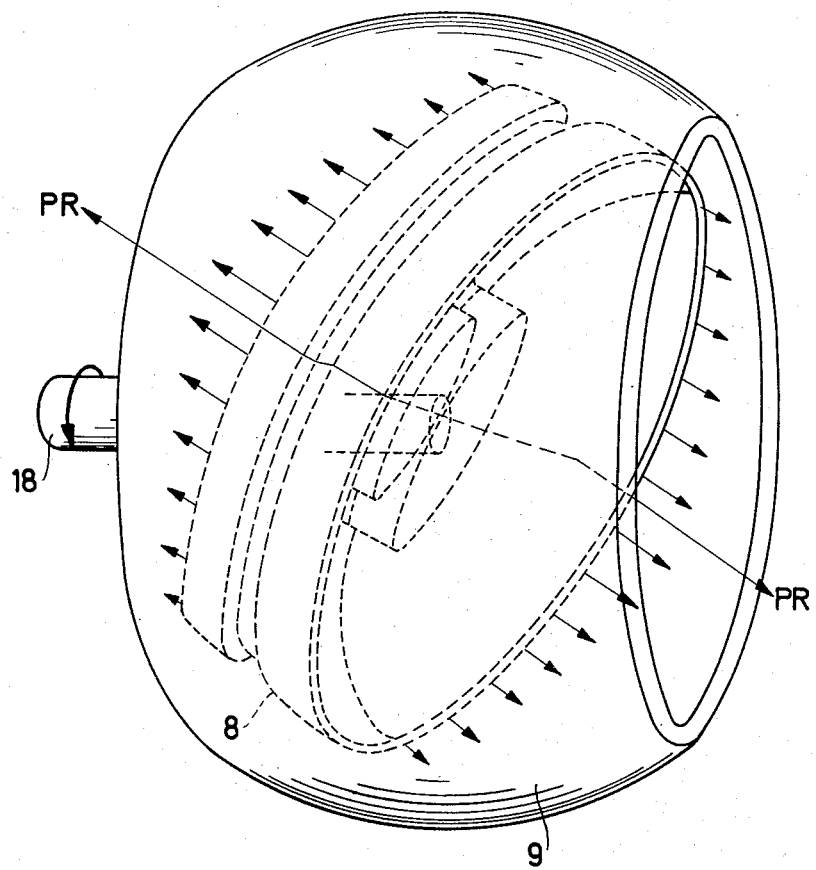

The relative movement of the magnet 15 in relation to the drum 9 generates induced Foucault currents in the drum due to its high conductivity. This gives rise to anti-E.M. forces between the two structures whose direction corresponds to that of the relative movement, of opposing signs and with an instantaneous magnitude directly proportional to the relative velocity prevailing between the two elements. FIG. 5 shows a vectorial presentation of these forces generated along the periphery of magnet 15.

It will be seen that these forces are at zero at the points of maximum displacement and are at a maximum when the point of the gyroscope passes through the plane normal to the axis of the motor through the centre of the gyroscope. This is due to the 90° phase shift between the displacement and the angular velocity of the gyroscope relative to the drum 9, typical of its sinusoidal nature.

FIG. 5 also shows the vectors of the couple resulting from the instantaneous forces, which couple is obtained by integrating said forces along each half-perimeter of the gryroscope. It is essential to note here that the resultant couple induced by the Foucault currents, which acts on the gyroscope, appears in a plane perpendicular to the plane of disalignment between the gyroscope 8 and the drum 9.

Consequently, the gyroscope precesses, that is to say, it moves on an axis normal to the resultant couple; but this axis is precisely the axis of displacement, and, for this reason, the gyroscope 8 tends to realign itself with the drum 9 following a plane and not spiral trajectory.

The restoring velocity of said gyroscope will depend on a number of parameters, among which may be noted the total flux of the magnet, the dimension of the air gap, the angular moment of the gyroscope, the conductivity of the partly spherical drum, and others.

These factors will be selected to obtain a slow return velocity. Since the return, in its position/time curve, is of exponential form, its speed can be determined by using the time constant of the exponential curve. This constant is of the order of 3 to 5 seconds to avoid observable tracking movements in vibratory conditions as defined in FIG. 2 and to allow at the same time for the passage of the dragging or tracking movements induced voluntarily by the operator. With this time constant, the voluntary movements will be responded to by the gyroscope and the stable platform with its instrument to be stabilized slowly but accurately, and with a certain angular delay which is instinctively compensated by the operator, whose positional reference is constituted by the sight mounted in the instrument 5.

The angular lag between the partly spherical drum 9 and the gyroscope 8 is proportional to the tracking velocity. Thus, when the operator imparts very rapid sweeping movements, for example when following a target in close proximity of the vehicle and moving at high speed, this angular lag could exceed the mechanical limits of the universal joint 10. The shock exerted on the gyroscope 8 through the collar of the joint gives rise to violent precessional movements, manifasting themselves in violent and extraneous movements of the instrument to be stabilized.

To eliminate this problem, it would be possible to reduce the tracking time constant, but this would result in low-frequency vibrations passing through the stabilizing system, thus reducing the efficiency of the equipment.

Figure 6:
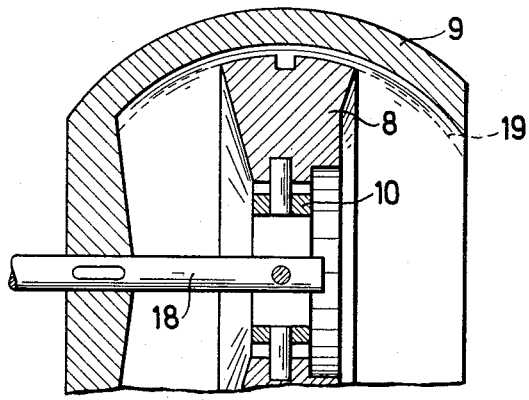
Figure 7:
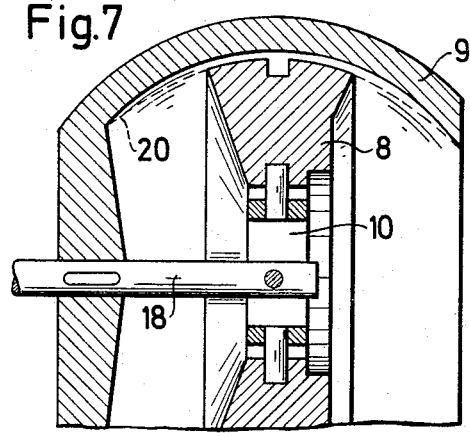

The problem described in the foregoing will be solved by using a variable clearance between the magnetic crown 15 of the gyroscope 8 and the convex internal wall of the partly spherical drum 9, as illustrated in FIGS. 6 and 7, which show the design difference between a fixed clearance 19 and a variable clearance 20. In the latter case, the gyroscope 8 operates normally along the central arc of its path, in which the interaction with the drum is small, while the clearance is relatively great. In this zone, occupied most of the time, the time constant is of three to five seconds, as already stated. However, when following a sudden drag, a large disalignment angle is generated, the gyroscope 8 will meet with a progressively diminishing clearance, which will increase the intensity of the Foucault currents and also the interaction between the drum and the gyroscope, while reducing in consequence the delay angle for the tracking velocity. The result is, that the gyroscope 8 cannot reach the mechanical limits of its universal joint 10, in that the variable clearance (air gap) acts like an electro-magnetic barrier (stop), preventing the precession of the gyroscope and thus satisfying all the planned requirements of the system.

The mode of functioning of the hydraulic transmission mechanism will now be described with reference to FIG. 8 of the drawings, which shows the manner in which the alignment of the disc 11 is irreversibly transmitted to the stable platform 4.

This function is effected by means of two servo-guided pistons of conventional construction, the operating principles of which are well known, so that in the following only a brief description of the mode of functioning will be given with reference to only one of the two actuating axles of the transmission mechanism, being identical to the other.

The command movement received by the mechanism originates in the disc 11, to which are connected two control axles or rods, each of these being connected to the operating spindle of a servo-valve 22 by means of an appropriate universal joint 21. The servo-valve has four vents, respectively connected to each one of the pressure lines, of the outlet lines and to both sides of the piston 25. When the position of the admission axle of servo-valve 22 registers with the position of the outlet axle 26 (as seen in FIG. 8), the pistons of the servo-valve block all the vents and the system is at equilibrium. In this case, any force applied to to the stable platform is resisted by the outlet piston 25 and will not be transmitted to the gyroscope. This satisfies the condition of irreversibility required by the system.

However, when the disc 11 moves about the corresponding axis, it will entrain the admission axle of the servo-valve 22, in such a manner that the piston rod will move in the appropriate direction, relative to the stable platform and the body of the servo-valve, until equilibrium is reached in a new position. In consequence of the operation of this mechanism, the forces to be generated by the gyroscope 8 are of a very small magnitude, which makes it possible to employ a gyroscope mass of small angular momentum and thus of greatly reduced weight and dimensions.

In addition to the devices described in the foregoing, which constitute the heart or base of the stabilizing system being object of the present specification, the assembly comprises certain further complementary elements, which, though of lesser importance, are nevertheless essential for the propper functioning of the system, and will be described in the following.

First of all, the reaction flywheel 16 (see FIG. 1) is provided to counteract the precession couples originating in the rigid components of the motor 7 and of the partly spherical drum 9. If unchecked, these couples would give rise to unnatural reactions in the control means 3, which render the precise operation of these rather difficult.

The reaction flywheel 16 is simply a rotating mass, which rotates in a direction contrary to the direction of rotation of the motor 7, with a combination of moment of inertia and angular velocity such, that there results an angular momentum identical to that of the components which give rise to the couples to be countered.

This reaction flywheel 16 is caused to rotate by the motor 7 through an intervening gearbox 17 of conventional design, which also serves to provide an element of low velocity and high momentum to operate the hydraulic cylinder 14 which actuates the transmission mechanism.

The level of stabilization required in each case will depend on the conditions of the particular application, and on the characteristics of the instrument to be stabilized. The platform serves to optimize the functions of the instrument, in spite of the sudden movements of the vehicle.

Most of the instruments which rely on the human eye directly as means of observation are limited in their use by the resolving capacity of the eye, which is 1 minute of an arc in and individual having 20/20 vision. This resolution corresponds to 0.3 milli-radians which, in turn, approximates the arc of probability of a manually operated firearm under good conditions.

The stabilizing capacity of the stabilized platform according to the invention is also of the same order of magnitude. Thus, we may formulate as requirement for the system that it should be capable of aligning an instrument with its target with an error of less than 0.3 milli-radians when the vehicle carrying it undergoes vibrations comprised between the curves shown in FIG. 2.

Figure 9:
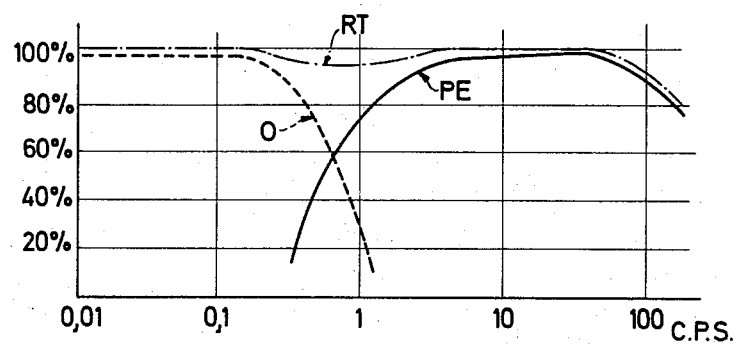
FIG. 9 is a graphic, illustrating the aligning ability of a normal operator at a certain vibration frequency.

To achieve this, it must be taken into account that the aiming system being object of the present application includes the operator and the stabilized platform. Thus, it will be clear that the task of the mechanism herein described consists in eliminating those vibrations generated by the moving vehicle which fall into a range of frequencies in which the operator is unable to react owing to his human limitations. The aligning ability of a normal operator at a certain vibration frequency can be expressed as the percentage of compensation which can be effected at his frequency, as indicated in FIG. 9, in which the curve RT (total response) is a combination of the dynamic response curve of the stabilized platform (PE) and the curve representing the aligning capacity of the operator (0). These curves are plotted as function of the frequency in cycles/second on the horizontal axis and of the percentage of compensation of the vertical axis of the diagram.

It will be noted that the total response of the system is almost plane, i.e., the same for all frequencies. This justifies the statement made to the effect that the stabilized platform complements the operator, enabling him to carry out his task properly, by eliminating thos vibrations which, due to their frequncy, would affect his compensating ability.

What is claimed is:

1. A system for mechanically stabilizing the alignment of instruments with line of sight comprising a vertical support having an upper extremity, a stabilizer means mounted on said upper extremity for movement in vertical and horizontal directions, for maintaining the line of sight of an instrument mounted thereon in constant alignment with a target with interference-free transmission to said instrument of aiming movements communicated by an operator to the stabilizer device, while preventing the stabilized instrument from undergoing sudden movements to which said vertical support and said stabilizer device may be subjected when mounted in a moving vehicle of any kind; said stabilizer means including a housing, an actuating motor, mounted in said housing and having a projecting shaft extending from opposite side thereof and defining first and second shaft end portions, a partly spherical drum rigidly secured to said first end of the shaft of the actuating motor for rotation therewith, a gyroscope rotatably mounted on said shaft within said partly spherical drum; means for mounting said gyroscope on said shaft for rotation therewith, said mounting means including a universal joint, a reaction flywheel mounted on said second end of said shaft and driven by said motor for counteracting the couples originating in the rigid components of the motor and of the partly spherical drum when said stabilizer means is subjected to a sudden displacement; and means for transmitting the relative displacement of the gyroscope in relation to the partly spherical drum to the instrument to be stabilized including hydraulic transmission means and a disc concentrically mounted in said gyroscope to remain in the same plane therewith; said hydraulic transmission means being operatively connected between said disc and said instrument to transmit to the instrument the position of said gyroscope, whereby the line of sight of said stabilized instrument will be maintained in alignment with the target, independently of sudden movements of the support system.

2. A system according to claim 1, wherein the gyroscope and the partly spherical drum rotate synchronously at a high annular velocity, said gyroscope being mounted on said shaft concentrically of the drum and said universal joint enables it to move angularly along two axes extending perpendicularly to each other and also perpendicular to the geometrical axis of the actuating motor, as defined by said shaft; said gyroscope having a permanently magnetized peripheral, circumferential portion and said drum consists of a nonmagnetic material, of low electrical resistivity.

3. A system according to claim 1 wherein said gyroscope includes a bearing mounted therein parallel to the plane of rotation, said concentrical disc being mounted on said bearing, whereby said disk remains stationary relative to rotation of the gyroscope at all times but remains in substantially the same plane defined by rotation of the gyroscope, said disk thereby defining the stabilized plane, the normal of said stabilized plane being parallel to the line of sight of the instrument to be stabilized.

4. A system according to claim 1 wherein said transmission means includes a system of servo-guided hydraulic cylinders operatively connected to said disk and including pistons having actuating rods connected mechanically with the axes of azimuth and elevation of the instrument to be stabilized, to ensure the desired alignment between the line of sight of said instrument and the actuator disc, and a hydraulic motor for supply fluid under pressure, to said hydraulic cylinders; said motor being located coaxial with the second end of the shaft of the actuating motor adjacent the reaction flywheel.

5. A system according to claim 2 wherein said partly spherical drum and said gyroscope are respectively dimensioned to define a variable clearance space between the magnetized periphery of the gyroscope and the concave internal face of the partly spherical drum; said space varying in accordance with the position of said gyroscope relative to a plane perpendicular to the geometrical axis of the stabilizer device, which plane normally accommodates the gyroscope in its rest position, said clearance space acting as an electromagnetic stop to avoid defects in the functioning of the system due to a sudden movement of the support of the system tending to cause displacement of said gyroscope beyond the amount permitted for the universal joint on which said gyroscope is mounted.

6. A system according to claim 1 including a gear transmission system operatively connected between said actuating motor and the reaction flywheel to rotate said flywheel in the direction opposite to the direction of rotation of the drive motor and of the gyroscope and the partly spherical drum, said gear transmission system providing a low-velocity, high momentum rotation.

7. A system according to claim 1, wherein the controls of the instrument to be stabilized, on which the operator has to act, are mounted within the stabilizer means; and said stabilizer means includes means for transmitting the actions of the operator to the instrument to be stabilized.

* * * * *